United States Patent [19]

Slavin

[11] Patent Number: 4,758,877
[45] Date of Patent: Jul. 19, 1988

[54] COLOR BAR AUTOFIND
[75] Inventor: Keith R. Slavin, Aloha, Oreg.
[73] Assignee: Tektronix, Inc., Beaverton, Oreg.
[21] Appl. No.: 30,772
[22] Filed: Mar. 24, 1987
[51] Int. Cl.⁴ .......................................... H04N 17/00
[52] U.S. Cl. ........................................ 358/10; 358/19
[58] Field of Search ...................... 358/10, 19, 20, 78, 358/81

[56] References Cited
U.S. PATENT DOCUMENTS

| | | | |
|---|---|---|---|
| 3,529,079 | 9/1970 | Moskovitz | 358/10 |
| 3,586,755 | 6/1971 | Wlasuk | 358/10 |
| 3,939,487 | 2/1976 | Leventer | 358/81 |
| 4,093,960 | 6/1978 | Estes | 358/10 |
| 4,468,693 | 8/1984 | Fujita | 358/78 |

Primary Examiner—Tommy P. Chin
Attorney, Agent, or Firm—Francis I. Gray

[57] ABSTRACT

A method for automatically finding color bars within a television video signal checks for a black burst at the end of a horizontal video line to determine the appropriate color bar standard for testing. Then a reference color burst, such as the yellow color burst, is searched for in the appropriate location within the horizontal line. Related color burst locations are demodulated to produce related color angles which are checked for relationship with the reference color burst. Also the luminance amplitudes for each color burst are compared to each other to determine whether a correct amplitude relationship is present. Each horizontal line of a picture frame is tested until either the color bars are found or all the horizontal lines have been tested. The found color bars are displayed in an appropriate format together with the line number within the picture frame, or a message indicating no color bars is displayed.

6 Claims, 4 Drawing Sheets

4,758,877

COLOR BAR AUTOFIND

BACKGROUND OF THE INVENTION

The present invention relates to television vectorscope displays, and more particularly to a method for automatically finding color bar information in a television video signal for display on a vectorscope.

Vectorscope displays are primarily designed for the display of color bar signals found in a conventional television video signal. Conventional vectorscopes allow an operator to select a horizontal line for display, but the color bar information is not always on the same horizontal line from signal to signal, and some signals may not have any color bars at all. Therefore occasionally a search for color bars is required, which means an operator has to look at each horizontal line in sequence until a color bar signal is located.

What is desired is a method for automatically finding color bars in a television video signal.

SUMMARY OF THE INVENTION

Accordingly the present invention provides a method for automatically finding color bars in a television by searching each horizontal line, from a starting horizontal line one beyond that currently being displayed on a vectorscope, in sequence for a yellow burst of color. The yellow burst is checked for proper amplitude compared to color burst or horizontal sync. Then the color angle for each of the other color bursts is demodulated and checked relative to the yellow burst. The color bursts also are checked to assure that their luminance components decrement in amplitude from a white level. When a horizontal line having color bars is identified, the line number is returned for display along with the vectorscope display for the same line. If a complete frame of video data is processed without the identification of color bars, a message is displayed indicating the absence of color bars in the video signal.

The objects, advantages and other novel features of the present invention will be apparent from the following detailed description when read in conjunction with the appended claims and attached drawing.

DESCRIPTION OF THE PREFERRED EMBODIMENT

Figure 1:
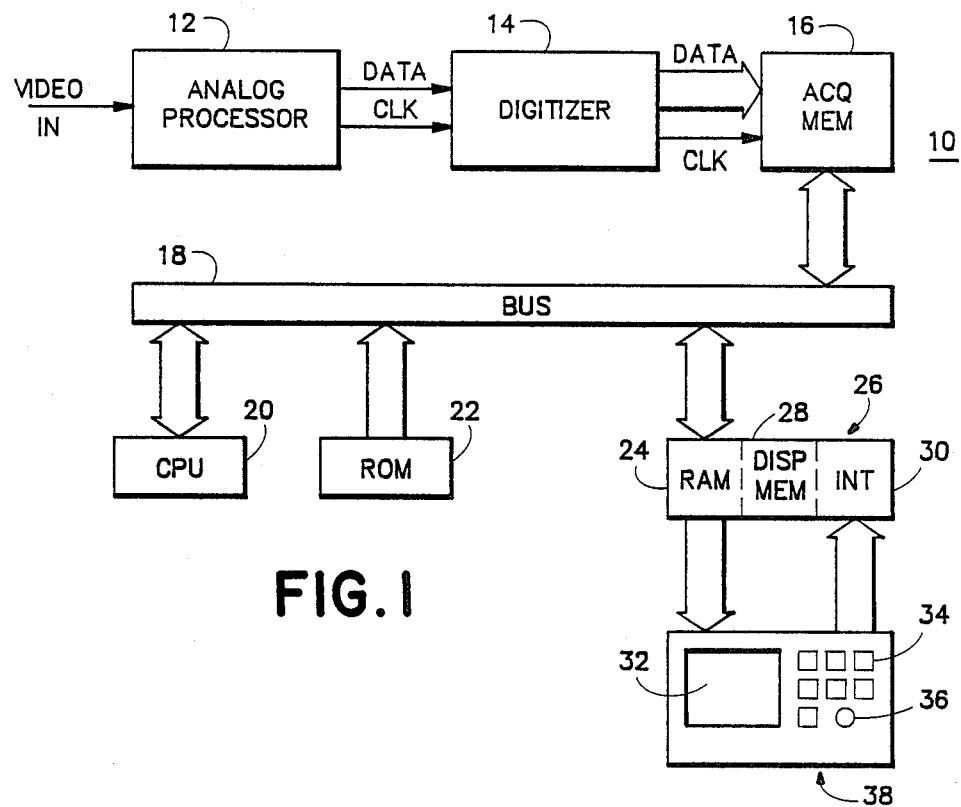
FIG. 1 is a block diagram of an instrument which uses the color bar autofind of the present invention.
Figure 2:
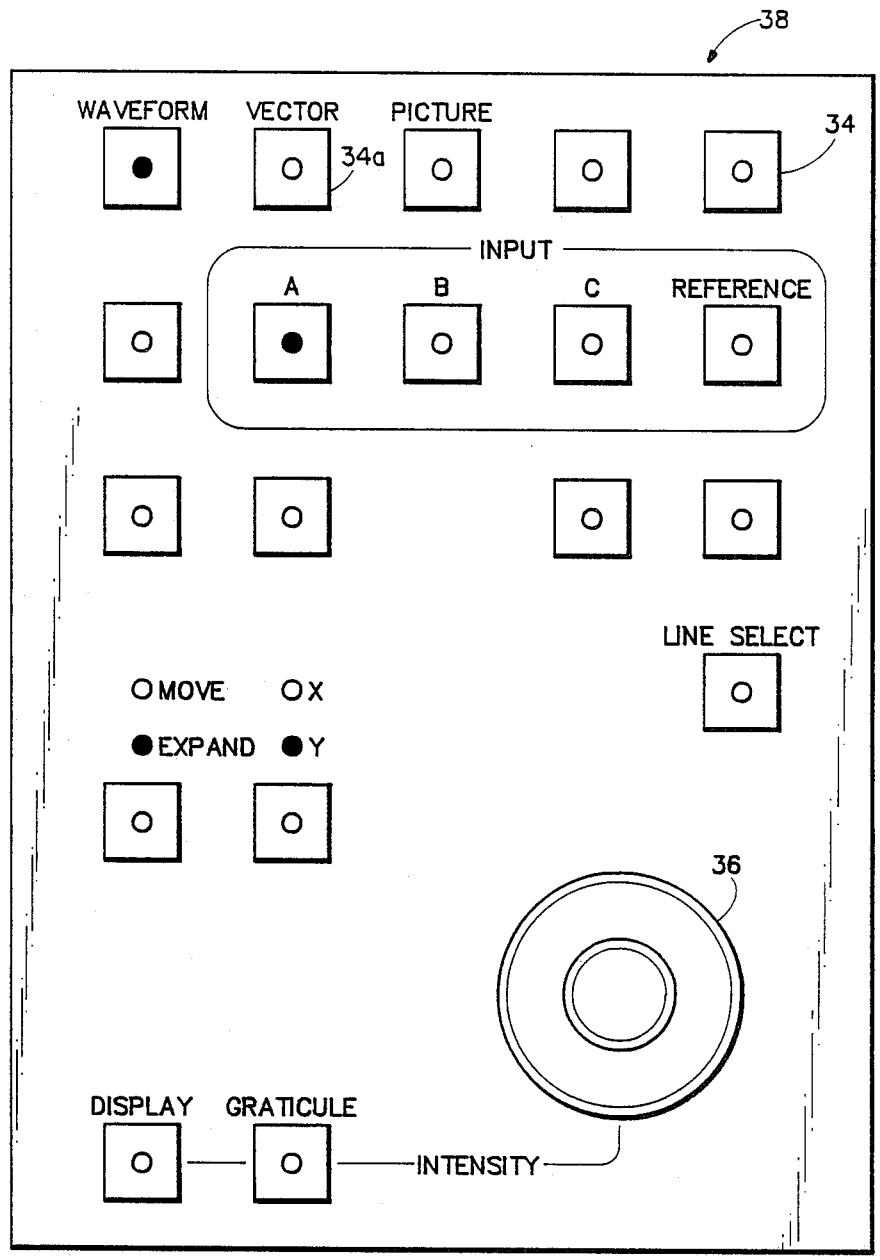
FIG. 2 is a plan view of a front panel for the instrument of FIG. 1.

Referring now to FIGS. 1 and 2 an instrument 10 is shown having a video input signal, such as a television video signal. The video signal is conventionally processed in the analog domain by an analog processor 12, digitized by a digitizer 14, and stored in an acquisition memory 16. The acquisition memory 16 is connected to a communications bus 18 to which also are connected a central processing unit (CPU) 20 with associated ROM 22 and RAM 24, and a display interface unit 26. The display interface unit 26 includes the RAM 24, a display memory 28 and an interface circuit 30. The contents of the display memory 28 are displayed on a screen 32.

The digitized video data from the acquisition memory 16 is processed by the CPU 20 according to the functions and parameters input by an operator via function buttons 34 and a rotary encoder knob 36 on a front panel, and via interaction with the screen. The processed data is stored in the display memory 28 together with appropriate scales, cursors and display information.

Figure 3:
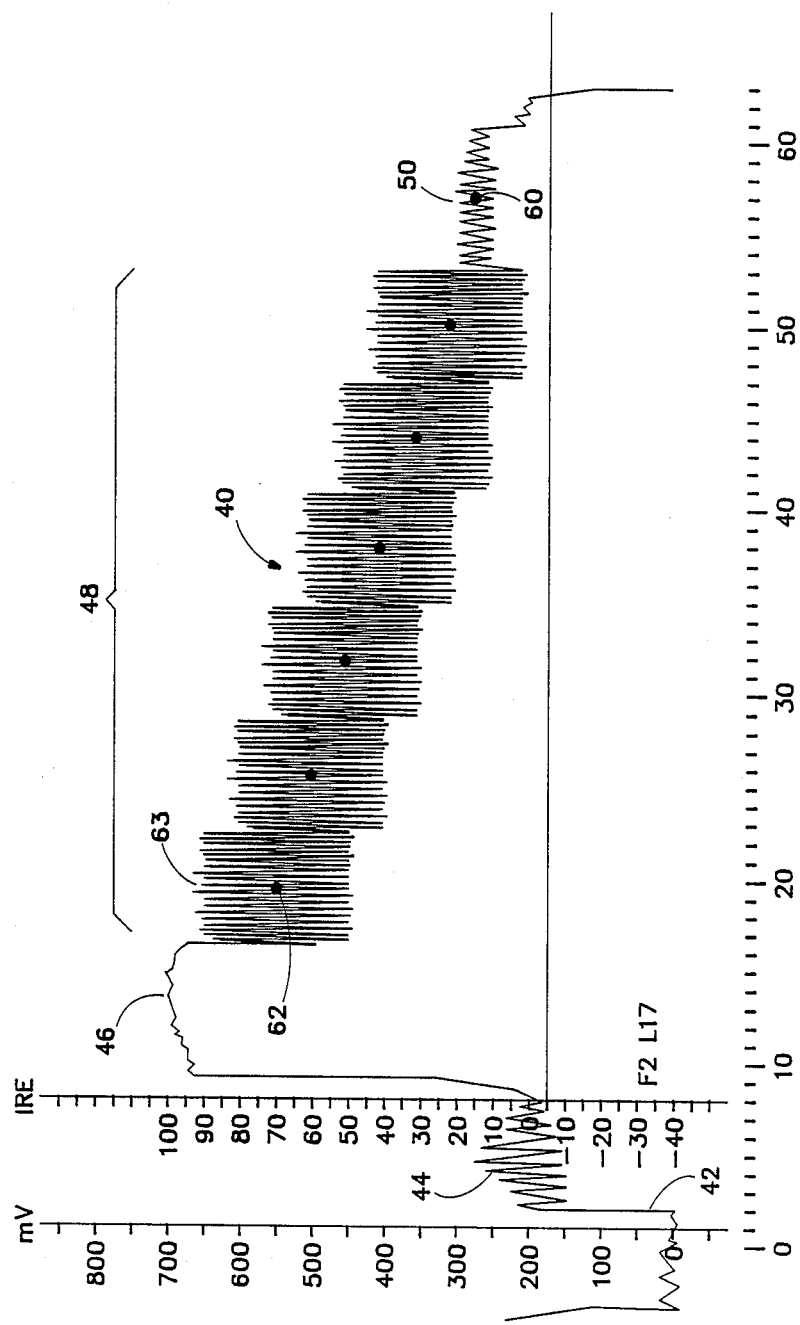
FIG. 3 is a waveform monitor display of a horizontal line of video data including color bars.
Figure 4:
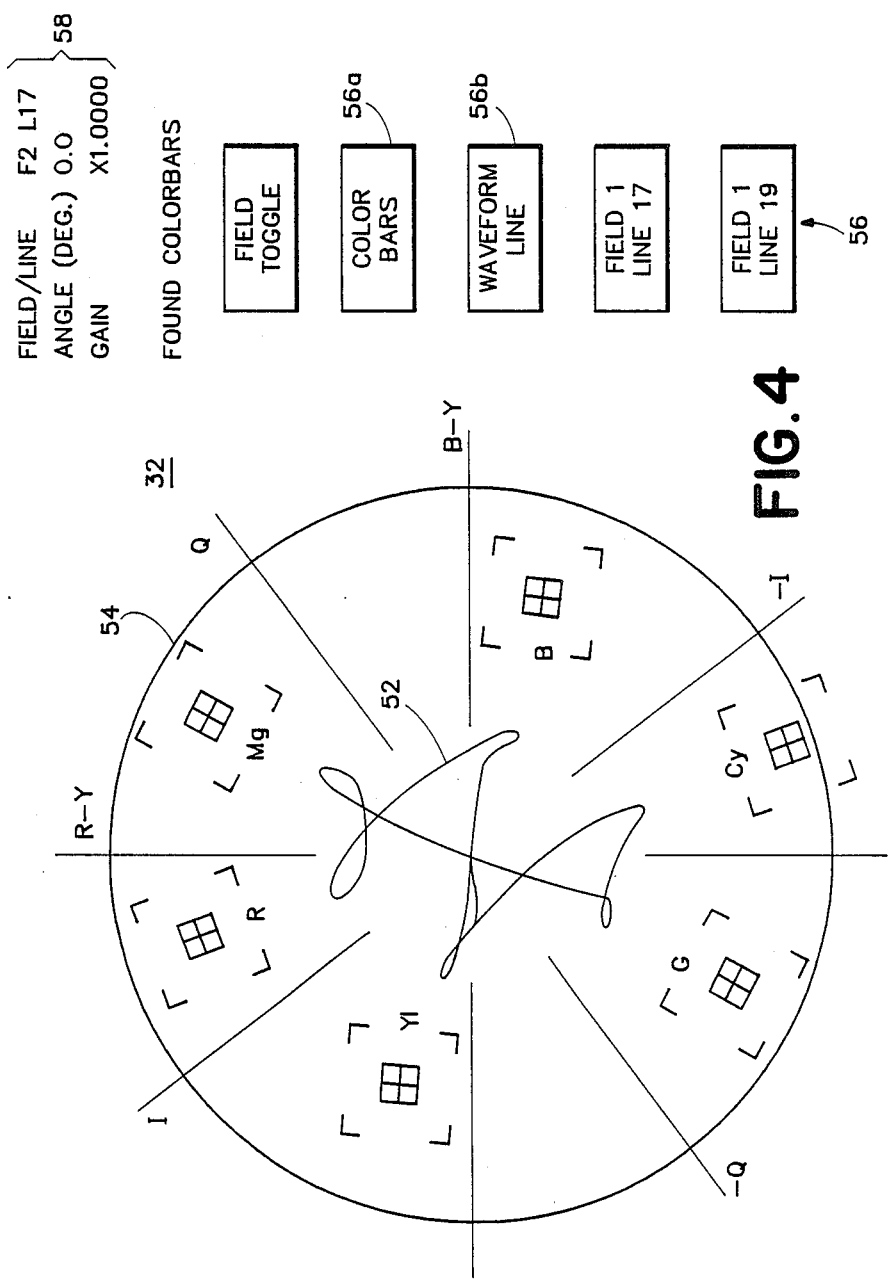
FIG. 4 is a vectorscope display of the horizontal line of video data of FIG. 3.

As shown in FIG. 3 a typical television video horizontal line waveform 40 having color bars is displayed on the screen 32 as on a waveform monitor. The waveform 40 has a horizontal sync pulse 42 at the beginning of the horizontal line followed by a color burst pulse 44. Next is a white luminance bar 46 followed by the color bursts 48 for the six primary colors: yellow, cyan, green, magenta, red and blue. For the FCC color bar standard a black burst 50 occurs at the end of the horizontal line, otherwise for the SMPTE standard the color bursts 48 are expanded to fill the horizontal line. The corresponding vectorscope display, selected by the VECTOR function button 34a, is shown in FIG. 4 with the demodulated color bars displayed as a conventional color bar signature 52 within the vectorscope graticule 54. The CPU 20 processes the chrominance information from the digitized video data in the acquisition memory 16 to produce the vectorscope display. Using a touch panel for the screen 32 a command, or "soft" key, area 56 includes "buttons" for various functions including a color bar soft key 56a. Contact of the color bar key 56a initializes the color bar autofind.

Initially the color bar autofind routine of the CPU 20 looks at the end of each line at a point 60 just prior to the horizontal sync pulse to determine if the chrominance amplitude exceeds a threshold value. If the value at the point 60 exceeds the threshold value, the color bar autofind routine looks for SMPTE color bars, otherwise it looks for full field color (FFC) bars. The only difference between the two color bar standards is the position of the center point for each color burst. At the location of a yellow center point 62 the video data from the acquisition memory 16 is tested to determine if the chrominance amplitude exceeds a threshold amplitude as compared with the larger of the color burst 44 or the horizontal sync pulse 42. If the amplitude of the yellow burst 63 is large enough, then the center points of the subsequent color burst positions, determined by incrementing the starting sample point 62 for the yellow color bar by the appropriate number of data samples corresponding to the color standard being applied, are checked by demodulating the color angle and checking to see that each angle is related to yellow within a given tolerance. Also the luminance for each color burst is checked to assure that the luminance component decrements in amplitude for successive color bars with respect to white. If any tests fail, then the line number is incremented and the tests repeated until either color bars are found or until all the horizontal lines of a picture frame have been checked, i.e., 525 for the NTSC system or 625 for the PAL system. The resulting line number and a message are displayed in an information area 58 of the screen 32 together with the vectorscope color bar signature 52.

If the search for color bars started from a line which already has color bars, then the color bar autofind routine will return the next color bars found which may be in the opposite video field or may be the same starting line. The soft keys may be replaced with function buttons 34 on the front panel 38. Also for a multi-function instrument 10, once the color bars 48 are found, the operator may contact a waveform soft key 56b to display the same horizontal line in a waveform monitor format as shown in FIG. 3.

Thus the present invention provides a method for automatically finding color bars in a television video signal by checking each successive horizontal video line in a picture frame for a color bar pattern, and displaying the line number and color bar signature in a vectorscope format when found.

What is claimed is:

1. A method for automatically finding color bars in a television video signal comprising the steps of:
   for each horizontal line of the television video signal testing for a reference color burst signal;
   if the reference color burst signal is identified, testing with respect to the reference color burst signal each related color burst location to determine the existence of all color burst signals; and
   repeating the testing steps for each horizontal line of the television video signal making up a picture frame until the color bars are found or until each horizontal line has been tested.

2. A method as recited in claim 1 further including the step of testing for a particular color bar standard.

3. A method as recited in claim 1 further including the step of displaying the horizontal line in which the color bars are found in an appropriate display format together with an indication of a number indicating the location of the horizontal line within the picture frame.

4. A method as recited in claim 2 wherein the step of testing for a particular color bar standard comprises the step of searching for a black burst at the end of the horizontal line being tested, the presence of the black burst indicating a FCC color bar standard and the absence of the black burst indicating a SMPTE color bar standard.

5. A method as recited in claim 1 wherein the step of testing for the reference color burst signal comprises the steps of:
   selecting video data from the horizontal line at a point in the center of an anticipated position within the horizontal line where the reference color burst signal should occur; and
   comparing the amplitude of the selected video data with the amplitude of a color burst video data component of the horizontal line to determine whether the amplitude is large enough to identify the reference color burst signal.

6. A method as recited in claim 1 wherein the step of testing each related color burst location comprises the steps of:
   demodulating video data corresponding to an anticipated center location for each related color burst location;
   checking the relationship of a demodulated color angle from the demodulated video data to the reference color burst signal; and
   checking a luminance amplitude relationship between the demodulated video data for each related color burst location and the reference color burst signal so that, if the demodulated color angles are correct within a given tolerance and the luminance amplitude relationships are correct, the color bars are found.

* * * * *